United States Patent
Hsu et al.

(10) Patent No.: US 7,796,457 B2
(45) Date of Patent: Sep. 14, 2010

(54) MOTHERBOARD WITH VOLTAGE REGULATOR SUPPORTING DDR2 MEMORY MODULES AND DDR3 MEMORY MODULES

(75) Inventors: Shou-Kuo Hsu, Tu-Cheng, Taipei Hsien (TW); Duen-Yi Ho, Tu-Cheng, Taipei Hsien (TW); Cheng-Shien Li, Tu-Cheng, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 596 days.

(21) Appl. No.: 11/766,105

(22) Filed: Jun. 21, 2007

(65) Prior Publication Data

US 2008/0259553 A1   Oct. 23, 2008

(30) Foreign Application Priority Data

Nov. 1, 2006   (CN) .......................... 2006 1 0063414

(51) Int. Cl.
*G11C 5/14* (2006.01)
(52) U.S. Cl. .................. 365/226; 365/52; 365/149; 365/189.09; 365/233.13
(58) Field of Classification Search .............. 365/51, 365/52, 149, 189.09, 226, 233.13
See application file for complete search history.

(56) References Cited

U.S. PATENT DOCUMENTS

| | | | |
|---|---|---|---|
| 6,256,217 B1 * | 7/2001 | Rondeau et al. ............... 365/52 |
| 6,298,426 B1 * | 10/2001 | Ajanovic .................... 711/172 |
| 6,498,759 B2 * | 12/2002 | Chang et al. ................ 365/226 |
| 6,516,381 B1 * | 2/2003 | Hamilton et al. ............ 711/105 |
| 6,681,271 B2 * | 1/2004 | Chih-Hung et al. ........... 710/43 |
| 7,127,622 B2 * | 10/2006 | Schnepper .................. 713/300 |
| 7,327,612 B2 * | 2/2008 | Bacchus et al. ........ 365/189.011 |
| 7,545,700 B2 * | 6/2009 | Chen et al. .................. 365/226 |
| 7,698,527 B2 * | 4/2010 | Meng et al. ................. 711/170 |
| 2008/0225499 A1 * | 9/2008 | Meng et al. ................. 361/767 |

FOREIGN PATENT DOCUMENTS

CN      1180331 C      12/2004

* cited by examiner

*Primary Examiner*—Dang T Nguyen
*Assistant Examiner*—Alexander Sofocleous
(74) *Attorney, Agent, or Firm*—Frank R. Niranjan

(57) ABSTRACT

An exemplary motherboard includes a first slot arranged for mounting a first type of memory, a second slot arranged for mounting a second type of memory, a voltage regulator electronically connected to the first slot and the second slot, and a serial presence detect (SPD) unit connected to the voltage regulator. The first memory and the second memory alternatively mounted on the motherboard, the SPD detects which type of memory is mounted on the motherboard, and the voltage regulator outputs voltages suitable for the type of the memory mounted on the motherboard according to a detection result of the SPD.

14 Claims, 1 Drawing Sheet

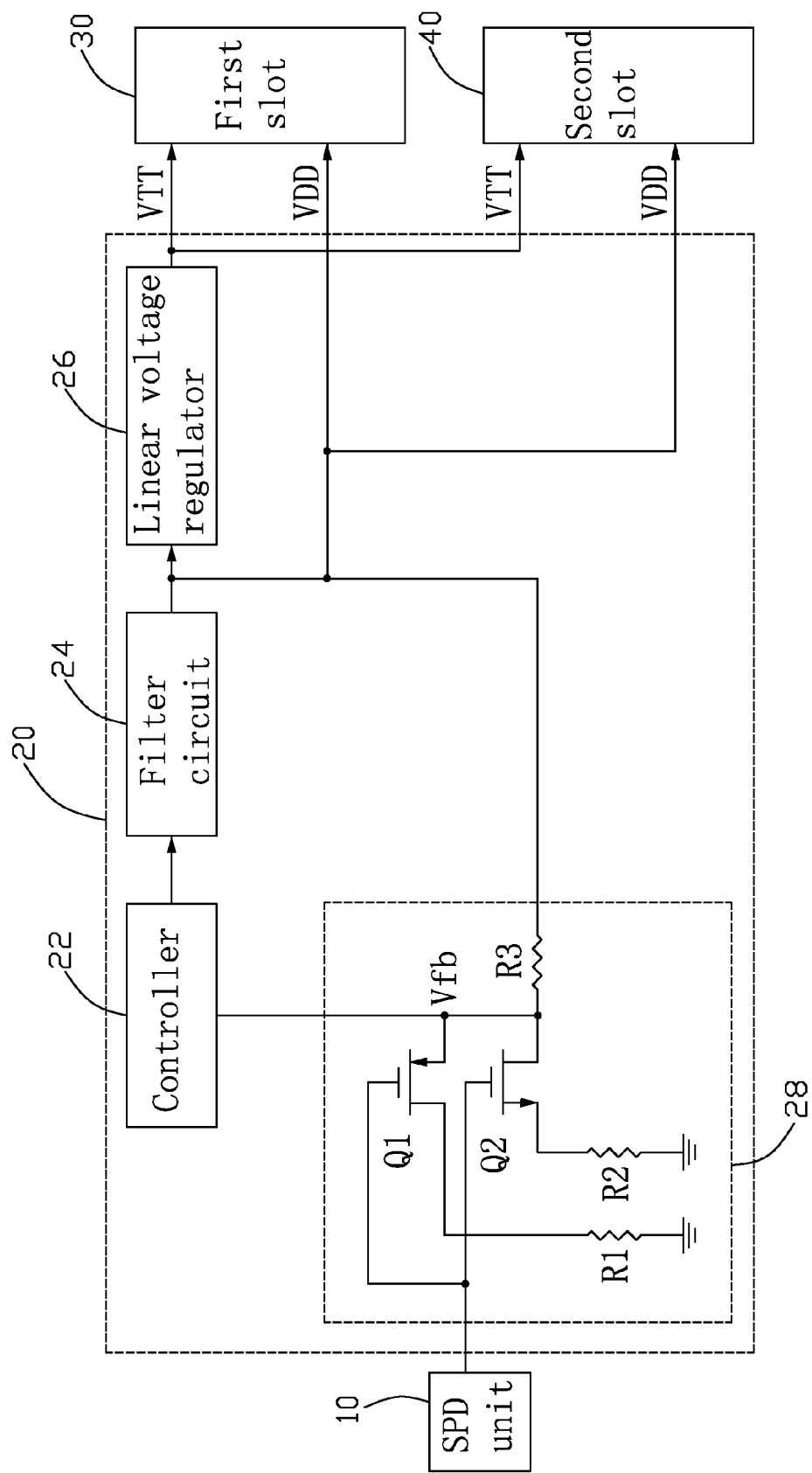

MOTHERBOARD WITH VOLTAGE REGULATOR SUPPORTING DDR2 MEMORY MODULES AND DDR3 MEMORY MODULES

BACKGROUND OF THE INVENTION

1. Field of the Invention

The present invention relates to a motherboard, and particularly to a motherboard that is compatible with different memories.

2. Description of Related Art

Currently, a typical personal computer comprises a motherboard, interface cards, and peripheral accessories. The motherboard is the heart of the personal computer. On the motherboard, in addition to the central processing unit (CPU), the chip set, and the slots for installing the interface cards, it further includes memory module slots for installing memory modules.

Due to constant change in the computer industry, memories used in the computer have changed from DDR2 (Double Data Ram II) used in the past to higher speed memories such as DDR3 (Double Data Ram III).

Because DDR2 is cheaper than DDR3, the main board with DDR2 still is in demand in the market. The difference in operating DDR2 and DDR3 includes: DDR2 utilizes 1.8V VDD and 0.9V VTT, while DDR3 utilizes 1.5V VDD and 0.75V VTT. Currently, no motherboard is compatible with both DDR3 and DDR2. As a result, more motherboards have to be fabricated with more production cost.

What is needed is to provide a motherboard capable of flexibly supporting different memories.

SUMMARY OF THE INVENTION

An exemplary motherboard includes a first slot arranged for mounting a first type of memory, a second slot arranged for mounting a second type of memory, a voltage regulator electronically connected to the first slot and the second slot respectively, and a serial presence detect (SPD) unit connected to the voltage regulator. The first memory and the second memory are alternatively mounted on the motherboard, the SPD detects which type memory is currently mounted on the motherboard, and the voltage regulator outputs voltages suitable for the type of the memory mounted on the motherboard accordingly.

Other advantages and novel features of the present invention will become more apparent from the following detailed description of preferred embodiment when taken in conjunction with the accompanying drawings, in which:

BRIEF DESCRIPTION OF THE DRAWING

The drawing is a circuit diagram of a motherboard in accordance with a preferred embodiment of the present invention.

DETAILED DESCRIPTION OF THE INVENTION

Referring to the drawing, a motherboard of a computer in accordance with an embodiment of the present invention includes a serial presence detect (SPD) unit 10, a regulating circuit 20, a first slot 30, and a second slot 40. The first slot 30 is used for installing a first memory, such as a DDR2 memory. The second slot 40 is used for installing a second memory, such as a DDR3 memory. SPD is information stored in an electrically erasable programmable read-only memory (EEPROM) chip on a memory module that tells the SPD unit 10 of the basic input/output system (BIOS) the module's size, data width, speed, and voltage. The type of the memory is identified by detecting different values stored in bytes of the SPD. The following table is the contents stored in Byte 2 of the SPD for DDR2 and DDR3.

| SPD Byte2 | Bit7 | Bit6 | Bit5 | Bit4 | Bit3 | Bit2 | Bit1 | Bit0 |
|---|---|---|---|---|---|---|---|---|
| DDR2 | 0 | 0 | 0 | 0 | 1 | 0 | 0 | 0 |
| DDR3 | 0 | 0 | 0 | 0 | 1 | 0 | 1 | 1 |

The voltage regulating circuit 20 comprises a controller 22, a filter circuit 24, a linear voltage regulator 26, and a feedback circuit 28.

The feedback circuit 28 comprises two transistors Q1 and Q2, two resistors R1 and R2, and a feedback resistor R3. The transistor Q1 is a PMOS transistor, and the transistor Q2 is a NMOS transistor. Two gates of the transistors Q1 and Q2 are commonly connected to the SPD unit 10, a source of the transistor Q1 is connected to a drain of the transistor Q2, and also connected to a feedback pin of the controller 22. A feedback voltage Vfb at the feedback pin is 0.6V in this embodiment. A node between the source of the transistor Q1 and the drain of the transistor Q2 is connected to an end of the feedback resistor R3. The drain of the transistor Q1 is connected to ground via the resistor R1, and the source of the transistor Q2 is connected to ground via the resistor R2. The resistances of the resistor R1, R2, and R3 are approximately 1.65 kohms, 2.2 kohms, and 3.3 kohms respectively. Turn-on and turn-off of the transistors Q1 and Q2 are respectively controlled in accordance with the contents of bit0 and bit2 of the SPD. An output of the controller 22 is connected to an input of the filter circuit 24, and the filter circuit 24 outputs a VDD voltage at an output end thereof. The output end of the filter circuit 24 is connected to another end of the feedback resistor R3. The VDD voltage is transmitted to the linear voltage regulator 26, and is converted into a VTT voltage transmitted to the first slot 30 and the second slot 40. The output end of the filter circuit 24 is connected to the first slot 30 and the second slot 40 to provide the VDD voltage.

When the DDR2 memory is mounted in the first slot 30, the second slot 40 is idle. When the computer is booted, the basic input/output system (BIOS) reads the contents of the SPD unit 10, the values in bit0 and bit1 of the SPD byte 2 is 00, the BIOS detects the DDR2 memory is mounted on the motherboard. The transistor Q1 is turned on, and the resistor R1 is connected in the circuit. The operation of the feedback circuit 28 is premised upon the fact that the level of the feedback voltage Vfb is stable, in this preferred embodiment, the level of the feedback voltage Vfb is 0.6V, according to the following formula: VDD=Vfb*(R3+R1)/R1, VDD equals 1.8V, and the voltage output from the controller 22 is 1.8V, and is provided to the filter circuit 24 which filters and rectifies the voltage as a smooth voltage output. The VDD is provided to the feedback circuit 28 and the DDR2 memory mounted on the first slot 30. The linear voltage regulator 26 is configured to receive the VDD voltage and provide a regulated output voltage of VTT (0.9V), which is provided to the DDR2 memory.

when the DDR3 memory is mounted on the second slot 40, the first slot 30 is idle. When the computer is booted, the basic input/output system (BIOS) reads the contents of the SPD unit 10, the values in bit0 and bit1 of the SPD byte 2 is 11, and the BIOS detects the DDR3 memory is mounted on the motherboard. The transistor Q2 is turned on, and the resistor R2 is connected in the circuit. According to the following formula:

VDD=Vfb*(R3+R2)/R2, VDD equals 1.5V, the voltage output from the controller 22 is 1.5V and is provided to the filter circuit 24 which filters and rectifies the voltage as a smooth voltage output. The VDD is provided to the feedback circuit 28 and the DDR3 memory mounted in the second slot 40. The linear voltage regulator 26 is configured to receive the VDD voltage and provide a regulated output voltage of VTT (0.75V), which is provided to the DDR3 memory.

Thus, the motherboard is capable of utilizing either the DDR2 or the DDR3, thus enhancing production capability and reducing production cost.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A motherboard comprising:
   a first slot arranged for mounting a first type of memory;
   a second slot arranged for mounting a second type of memory, the first memory and the second memory alternatively mounted on the motherboard;
   a voltage regulator electronically connected to the first slot and the second slot, wherein the voltage regulator comprises a controller and a feedback circuit, the controller comprises a feedback pin and an output end, a first voltage at the feedback pin is a feedback voltage; and
   a serial presence detect (SPD) unit connected to the voltage regulator configured for detecting which type of memory is mounted on the motherboard and controlling status of the feedback circuit, wherein a first end of the feedback circuit is connected to the SPD unit, a second end of the feedback circuit is connected to the feedback pin of the controller, a third end of the feedback circuit is operable to receive a second voltage from the output end of the controller, the controller changes the second voltage output to the third end of the feedback circuit and the first or second slot to ensure the feedback voltage being equal to a third voltage at the second end of the feedback circuit.

2. The motherboard as claimed in claim 1, wherein the feedback circuit comprises a first transistor and a second transistor, gates of the first transistor and the second transistor commonly connected as the first end of the feedback circuit which is connected to the SPD, a source of the first transistor connected to a drain of the second transistor to function as the second end of the feedback circuit, and also connected to the feedback pin of the controller, a drain of the first transistor is connected to ground via a first resistor, a source of the second transistor is connected to ground via a second resistor, a node between the source of the first transistor and the drain of the second transistor functions as the third end of the feedback circuit which is operable to receive the second voltage, and is connected to the first slot, and the second slot.

3. The motherboard as claimed in claim 2, wherein the voltage regulator further comprises a linear voltage regulator, the output end of the controller is connected to the first slot and the second slot via the linear voltage regulator.

4. The motherboard as claimed in claim 3, wherein the voltage regulator further comprises a filter circuit comprising an input end connected to the output pin of the controller, and an output end, a feedback resistor is connected between the output end of the filter circuit and the feedback pin of the controller.

5. The motherboard as claimed in claim 4, wherein the resistance of the feedback resistor is approximately 3.3 Kohm.

6. The motherboard as claimed in claim 2, wherein the first transistor is a PMOS transistor, and the second transistor is an NMOS transistor.

7. The motherboard as claimed in claim 2, wherein the resistance of the first resistor is approximately 1.65 Kohms, the resistance of the second resistor is approximately 2.2 Kohms.

8. The motherboard as claimed in claim 1, wherein the first slot is a DDR2 slot, and the second slot is a DDR3 slot.

9. The motherboard as claimed in claim 1, wherein the feedback voltage at the feedback pin is 0.6V.

10. A motherboard, comprising:
    a DDR2 slot arranged for mounting a DDR2 memory;
    a DDR3 slot arranged for mounting a DDR3 memory, the DDR2 memory and the DDR3 memory selectively mounted on the motherboard;
    a voltage regulator electronically connected to the DDR2 slot and the DDR3 slot, wherein the voltage regulator comprises a controller, and a feedback circuit connected to the controller, when the DDR2 memory is mounted in the DDR2 slot, a SPD stored in the DDR2 memory tells the controller to provide voltage suitable for the DDR2 memory for a voltage at a feedback pin of the controller should be equal to a voltage from the feedback circuit, when the DDR3 memory is mounted in the DDR3 slot, the SPD stored in the DDR3 memory tells the controller to provide voltage suitable for the DDR3 memory to ensure the voltage at the feedback pin the controller being equal to the voltage from the feedback circuit.

11. The motherboard as claimed in claim 10, wherein the SPD stored in the memories tell the voltage regulator to provide suitable voltages via a basic input/output system (BIOS) capable of determining which type of memory is mounted on the motherboard based on the SPD.

12. A motherboard comprising:
    a DDR2 slot configured for mounting a DDR2 memory therein;
    a DDR3 slot configured for mounting a DDR3 memory therein;
    a basic input/output system (BIOS) capable of determining which type of memory is mounted on the motherboard based on a serial presence detect (SPD) stored in an electrically erasable programmable read-only memory (EEPROM) chip of the memory; and
    a voltage regulating circuit electronically connected to the DDR2 slot and the DDR3 slot, wherein the voltage regulating circuit comprises a controller and a feedback circuit connecting an output pin and a feedback pin of the controller, the output pin of the controller is capable of outputting voltages suitable for the detected type of memory mounted on the motherboard by the SPD to ensure a voltage at the feedback pin of the controller being equal to a voltage from the feedback circuit accordingly when one of the DDR2 memory and the DDR3 memory is selectively mounted on the motherboard.

13. The motherboard as claimed in claim 12, wherein the voltage regulating circuit further comprises a filter circuit comprising an input end connected to the output pin of the controller, and an output end connected to the first and second slots, wherein an input end of the feedback circuit is connected to the BIOS and an output end of the feedback circuit is connected to the feedback pin of the controller, the output end of the feedback circuit is connected to the output end of the filter circuit via a resistor.

14. The motherboard as claimed in claim 13, wherein the feedback circuit comprises a first transistor and a second transistor, gates of the first transistor and the second transistor commonly acts as the input end of the feedback circuit, a source of the first transistor connected to a drain of the second transistor with a node which acts as the output end of the feedback circuit, a drain of the first transistor is connected to ground via a resistor, a source of the second transistor is connected to ground via a resistor.

* * * * *